May 1, 1956   J. W. GLASER   2,744,201
RECIPROCATING ELECTRIC MOTOR
Filed July 28, 1955
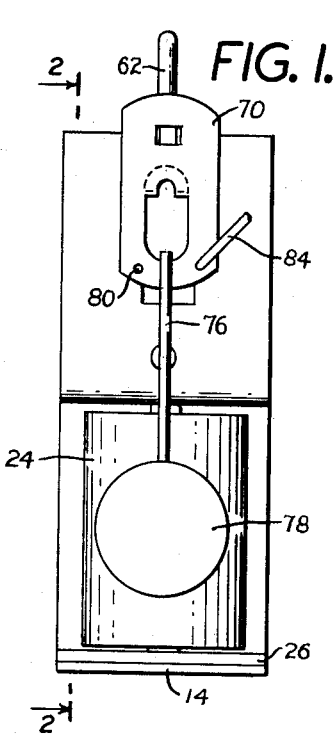
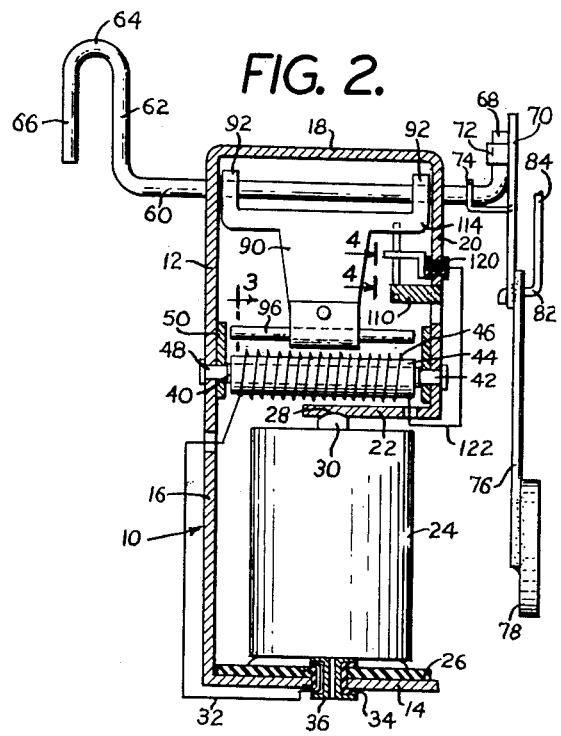
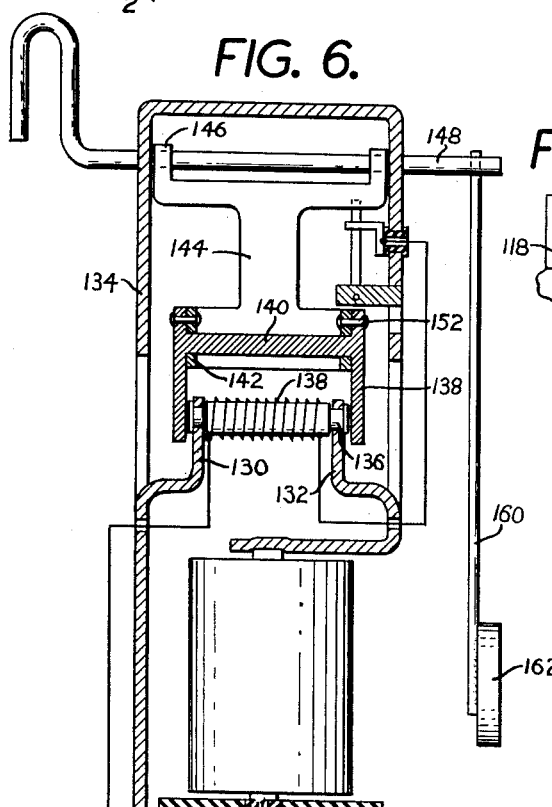
INVENTOR
JULES W. GLASER.
BY
ATTORNEY

United States Patent Office 2,744,201
Patented May 1, 1956

2,744,201

RECIPROCATING ELECTRIC MOTOR

Jules W. Glaser, Yonkers, N. Y.

Application July 28, 1955, Serial No. 524,861

1 Claim. (Cl. 310—32)

This invention relates to a reciprocating electric motor.

Reciprocating motors powered by small dry cells commonly known as flashlight batteries are used in the display and advertising fields and in many other applications requiring low-powered reciprocating action. In the display field several factors are extremely important. In the first place, the motor must be relatively inexpensive since it is usually discarded following its use in connection with a single display. It constitutes a give-away, expendable item, used in large quantities for advertising purposes. Another requirement is that it occupy as little space as possible. This is important not only to conserve shipping space but also to meet the needs of displays having a minimum of available space for the motor mechanism. Still another requirement is that the motor consume as little electrical energy as possible so that it may operate as long as possible on a single dry cell. A still further requirement is that the motor possess as much power as possible in order to operate some of the more intricate, heavier display mechanisms.

The principal object of this invention is the provision of a reciprocating electric motor of the general character described, which comprises a relatively flat, compact package, which consumes relatively little current, which provides relatively high power, very considerable torque, and which is so simple in construction that it may be produced at relatively small cost, both for labor and materials.

More specifically, the motor herein described and claimed is so arranged that the dry cell which energized it is disposed at one end of the motor mechanism, in axial alignment therewith. That is, when the motor is de-energized and in a position of rest, a line drawn axially through the dry cell will pass through the permanent magnet which cooperates with said electromagnet and through the main drive shaft to which said permanent magnet is connected. Stated differently, said coil and core, said permanent magnet and said drive shaft all occupy a substantially common plane and they are all substantially parallel to each other. The central electrode of the dry cell occupies the same plane but it is perpendicular to the respective axes of said coil and core, permanent magnet and drive shaft. In other reciprocating motors known to applicant, the dry cell is positioned off to the side of the motor mechanism, producing a bulky structure.

In other reciprocating motors in the prior art, of the general character herein described, only a single pole of the permanent magnet is repelled (or possibly attracted) by a single pole of the electromagnet. The lines of force of both magnets encounter strong resistance since they must travel paths which are relatively non-conductive. In the present invention, both poles of the permanent magnet are simultaneously repelled (they could also be attracted) by both poles of the electromagnet. The lines of force of both magnets pass through a virtually complete cycle of magnetic material and hence the resistance to said lines of force is at a virtual minimum at the same time providing a flux path of minimum length with a correspondingly minimal leakage loss. The net result is the provision of a mechanism which is highly efficient and which makes the most of the least, that is, which produces the greatest amount of power with the expenditure of the least amount of electrical energy.

In the present invention, the electromagnet comprises a core, which is simply a straight rod, a coil on said core, and a pair of plates secured to the ends of the core, thereby constituting, in effect, an electromagnet having a U-shaped core, or, stated differently, a U-shaped electromagnet. The two plates serve as the arms of the U and they constitute the poles of the electromagnet. The permanent magnet is a straight bar magnet and it is so supported by the drive shaft that it passes between said pole plates of the electromagnet, the poles of the permanent magnet just clearing the pole plates of the electromagnet. The air gap between the poles of the respective magnets is so small as to be negligible in its effect upon the lines of force.

In a modified form of this invention, the permanent magnet is provided with a pair of end plates which constitute its poles and convert it to a U-shaped magnet. The core of the electromagnet is simply a straight rod. When the permanent magnet moves in its arcuate path, its two pole plates pass the poles of the electromagnet with only sufficient clearance between them to prevent conflict. In the first case the electromagnet was a U-shaped magnet and the permanent magnet a straight bar magnet; in the present case the permanent magnet is a U-shaped magnet and the electromagnet is a straight core magnet.

Another important object of this invention is the provision of a switch for the reciprocating motor herein claimed, which provides excellent contact and conductivity when closed and which affords a minimum of frictional or flexing resistance to actuation thereof. This switch involves the use of a very fine switch arm which flexes with the smallest expenditure of energy. It is fixed at one end and in engagement at its opposite end with an actuating member by which it is flexed. The mechanical advantage is considerable since it extends the full length of the switch arm. Said arm may be made out of relatively thin, flexible material and as long as desired and hence its resistance to flexing is virtually completely absent. The contact members are situated between its two ends and they do not add measurably to the effort required to flex the switch arm. These contact members are made of silver for greater conductivity and a highly efficient switch mechanism is thereby provided.

Another object of the invention is the provision of a metal casing for the reciprocating motor herein claimed, which casing may be stamped and formed out of strip material, and which is used not only to support the component parts of the motor but also to support the dry cell and to serve as a conductor in the motor circuit.

A still further object of this invention is the provision of adjustable supporting means for a counter-weight, which means is adapted to securely support the counter-weight in any desired or required position, and which may also be employed as a support for auxiliary or secondary drive means. When motors of this kind are used to power animated displays, it is important that the weight of the movable parts of said displays be adequately counter-balanced. Since the movable parts in the various displays occupy an infinite number and variety of different locations, it is essential that means be provided for accurately positioning the counter-weight to properly oppose the weight and action of said movable parts. In the present invention, a removable clip is placed upon the main drive shaft and the counter-weight is secured to the clip. This may be done by welding the weight to the clip in any suitable position. By the same token, a secondary drive rod may be pivotally connected to said clip, or connected in any other suitable manner, in order to actuate other movable parts of the display.

The invention is illustrated in the accompanying drawing in which:

Fig. 1 is a side view of a reciprocating motor made in accordance with one form of this invention.

Fig. 2 is a vertical section therethrough on the line 2—2 of Fig. 1.

Fig. 3 is a fragmentary sectional view on the line 3—3 of Fig. 2 showing the supporting means for the permanent magnet.

Fig. 4 is another fragmentary view, taken on the line 4—4 of Fig. 2, showing the switch mechanism.

Fig. 5 is a fragmentary view on the line 5—5 of Fig. 4, also showing the switch mechanism.

Fig. 6 is a sectional view similar to that of Fig. 2, showing a motor made in accordance with a second form of this invention.

Referring now to the first form of this invention, as shown in Figs. 1 to 5 inclusive, it will be seen that a reciprocating electric motor 10 is provided which has a metal case or housing 12 made of a single strip of suitable metal, such as aluminum. This metal constitutes a satisfactory conductor of electric current and it does not interfere with the magnetic fields and action which this motor involves. The casing has a bottom wall 14, a side wall 16, a top wall 18, a second side wall 20, and an intermediate wall 22. The two side walls are parallel to each other and the top, bottom and intermediate walls are also generally parallel to each other. Dry cell 24 is mounted on the bottom wall 14. If necessary, an insulating sheet 26 may be interposed between said bottom wall and said dry cell. Intermediate wall 22 may have a recess 28 pressed into it to receive the central electrode 30 of said dry cell. The casing of the dry cell, which constitutes its outer electrode, may be connected by means of a wire 32 to the motor herein claimed and one way of doing this is to provide registering holes in the bottom wall 14 and insulating sheet 26, insert an insulating eye or bushing 34 and then secure thereto a metal eyelet 36, and clamp the wire 32 between the two eyelets. The metal eyelet 36 would be in contact with the casing of the dry cell without being in contact with the casing 12. The wire 32 would be in contact with the casing of the dry cell through said metal eyelet 36 but it would not be in contact with casing 12. There would be sufficient springyness or tension in intermediate wall 22 to hold the dry cell in place on the bottom wall.

Side walls 16 and 20 support the electromagnet 40. Said electromagnet comprises a core 42 and a paper tube 44 or the like on said core, and a coil 46 on said paper tube. The core, naturally, is made of ferrous metal, for example, soft iron. It is simply a straight rod with reduced ends 48 and mounted on said reduced ends is a pair of ferrous metal plates 50. These plates abut the shoulders formed between the main body of said core 42 and its reduced ends 48. Said reduced ends of the core also project through registering holes in the two side walls 16 and 20 of the casing, and they are peened over to rivet said core to said side walls 16 and 20 of the casing. This not only holds the core in place but it also holds plates 50 in place. These plates serve as poles and, in effect, a U-shaped electromagnet is thereby provided.

Also extending through registering holes in the two walls 16 and 20 is a shaft 60 which constitutes the main drive shaft of the mechanism. This shaft is free to engage in angular movement about its own axis but means are provided for preventing axial movement thereof. One end of shaft 60 is bent laterally to form an arm 62 and then around to form a bight 64 and then parallel to arm 62 to form a second arm 66. A U-shaped end piece is thereby formed on said drive shaft and said end piece may be used as a means of attaching said drive shaft to the movable parts of an animated display. The opposite end of said shaft 60 may also be bent laterally to form an arm 68. It is to this arm that a clip 70 may be secured. Clip 70 has a loop 72 which is struck out therefrom and which is adapted to receive arm 68 of shaft 60. Said clip also has an L-shaped arm 74 which is struck out therefrom and which is provided with an opening to accommodate said shaft 60. Clip 70 hangs from shaft 60 by means of the L-shaped bracket 74 and it is fixed against angular movement relative to said shaft by means of said loop 72. Said clip may be slipped on and off shaft 60 very readily but once it is mounted thereon it is adequately secured thereto. To save shipping space, for example, said clip 70 and the weight which it supports may be packed in unassembled condition, separate from the motor proper, subject to being assembled in the plant of the display manufacturer.

A rod 76 may be welded to clip 70 in any desired position. A weight 78 may be welded to said rod 76. It is in this way that the weight is secured to the shaft 60 in any desired position relative to the U-shaped arm 62, 64, 66 and the moving part or parts to which said U-shaped arm is secured.

Clip 70 may also be provided with a plurality of holes 80. Into these holes may be inserted the bent ends 82 of rods or wires 84. These rods or wires may be hooked up to other movable parts of the same display or to movable parts of an adjacent display so that the same motor may operate a greater number of parts in many more ways than would be possible using said U-shaped arm alone.

A plate 90 is provided with a pair of arms 92 which are secured to the shaft 60 between the two side walls 16 and 20 of casing 12. These arms 92 may serve as the means of preventing axial movement of said shaft 60 relative to the casing 12. The lower end of plate 90 is curled to form a channel 94 for a permanent magnet 96. This permanent magnet is a straight bar magnet, for example, circular in cross section. A second plate 98 is also provided with a curled end portion 100 which is also adapted to receive said permanent magnet 96. When the two plates 90 and 98 are fastened together by means of a rivet 102 (they may be integral with each other), their curved or curled end portions 94 and 100 comprise a receptacle for the permanent magnet and hold said magnet in place between them.

It will be observed in Fig. 2 that magnet 96 is virtually as long as the distance between the two pole plates 50. Said magnet barely clears the two plates 50 in order to enable the magnet to move past the plates during operation of the motor and yet to leave as small a gap as possible between the poles of said magnet and said plates. It will be observed that when shaft 60 engages in angular movement, hanging plate 90 carries the permanent magnet 96 between and past the two plates 50. Weight 78 functions as a pendulum to assist such angular movement and to give it regularity.

Struck out from side wall 20 is an arm 110. Riveted to said arm is a thin, flexible blade 112 which serves as the switch arm of the mechanism. It will be observed that the upper end of said switch arm 112 projects into engagement with a shoulder 114 of plate 90. When shaft 60 oscillates together with plate 90, shoulder 114 engages the switch arm 112 first on one side and then on the other and causes it to flex first in one direction and then in the other. Secured to the switch arm intermediate its ends is a pair of silver contact members 116. A bifurcated bracket 118 is insulated from the side wall 20 of the casing by means of an insulating bushing 120, while being secured to said side wall and its two arms are situated on opposite sides of contact members 116. When switch arm 112 is caused to flex as above described, first in one direction and then in the other, first one contact member 116 engages one of the arms of said bifurcated bracket 118 and then the other contact member 116 engages the other arm of said bracket. A wire 122 is connected to said bracket 118 and also to one end of coil 46. Wire 32 is connected to the opposite end of said coil.

The circuit is as follows: Dry cell 24, and more particularly its casing or negative electrode, wire 32, coil 46, wire 122, bracket 118, one of the contacts 116, switch arm 112, bracket 110, side wall 20, intermediate wall 22, and the positive electrode 30 of the dry cell. It will be apparent from the foregoing, that the only movable contacts in the entire system are the contact members 116. In view of the fact that they are made of silver, a very efficient switch mechanism is thereby provided.

Turning now to the second form of this invention and to Fig. 6 of the drawing, it will be observed that arms 130 and 132 are struck out from the sides of casing 134 and said arms support the core 136 of coil 138. Bar magnet 140 is held by arms 142 of hanging plate 144, the upper end of said plate being provided with arms 146 which are secured to shaft 148. Plates 150 are secured to arms 142 by means of rivets 152. Said plates 150 are made of ferrous metal and they are thereby held in tight contact with the ends of the permanent bar magnet 140. Plates 150 thereby become the pole plates of said magnet and the magnet is thereby converted from a straight bar magnet to a U-shaped magnet. Plates 150 correspond to plates 50 above described except that they are secured to the permanent magnet instead of to the electromagnet. There is small clearance between the ends of core 136 and the two pole plates 150, thereby rendering it possible for the pole plates to move relative to the electromagnet in oscillatory fashion when the shaft 148 engages in oscillatory angular movement.

In all other essential respects, the mechanism shown in Fig. 6 corresponds to that shown in Fig. 2 and a description of the latter is a description of the former. Arm 160 supporting weight 162 is shown in Fig. 6, however, to be welded directly to shaft 148 instead of to a clip 70 which may be secured to a corresponding shaft. This is intended to illustrate a simpler construction which may be followed, if desired.

The foregoing is illustrative of preferred forms of this invention and it will be understood that these preferred forms may be modified and other forms may be provided within the broad spirit of the invention and the broad scope of the claim.

I claim:

A reciprocating electric motor, comprising a housing, a dry cell carried by said housing, an electromagnet mounted in said housing, said electromagnet having a core, a shaft mounted in said housing for angular movement, a support secured at one end to said shaft, a permanent magnet secured to the opposite end of said support, the relative positions of said shaft, permanet magnet and electromagnet being such that they are maintained in axially parallel relationship to each other, both poles of the permanent magnet being disposed adjacent and facing the poles of the electromagnet when the shaft is in a given angular position, thereby providing a relatively closed magnetic circuit between the two magnets with only small air gaps between their respective poles, said permanent magnet being adapted to sweep past the electromagnet on oscillatory angular movement of the shaft into and out of said given angular position of said shaft, and a switch connected to said electromagnet and said dry cell closing the circuit between them when the permanent magnet reaches a predetermined position relative to the electromagnet, said electromagnet being provided with a pair of end plates which project laterally from the ends of its core in parallel relation to each other and constitute the poles of said electromagnet, said end plates being situated to receive the permanent magnet between them, and when the shaft is in its said given angular position said end plates are disposed directly opposite and adjacent the poles of the permanent magnet.

References Cited in the file of this patent

UNITED STATES PATENTS

| 2,426,970 | Hufnagel | Sept. 2, 1947 |
| 2,589,959 | Quick | Mar. 18, 1952 |
| 2,598,954 | Wengel | June 3, 1952 |

FOREIGN PATENTS

| 374,095 | France | Apr. 9, 1907 |
| 463,072 | France | Dec. 8, 1913 |
| 677,304 | France | Dec. 9, 1929 |